Feb. 6, 1951     E. R. McCLURE ET AL     2,540,747
SAUSAGE SKINNING AND CUTTING MACHINE
Filed April 2, 1949     3 Sheets-Sheet 3

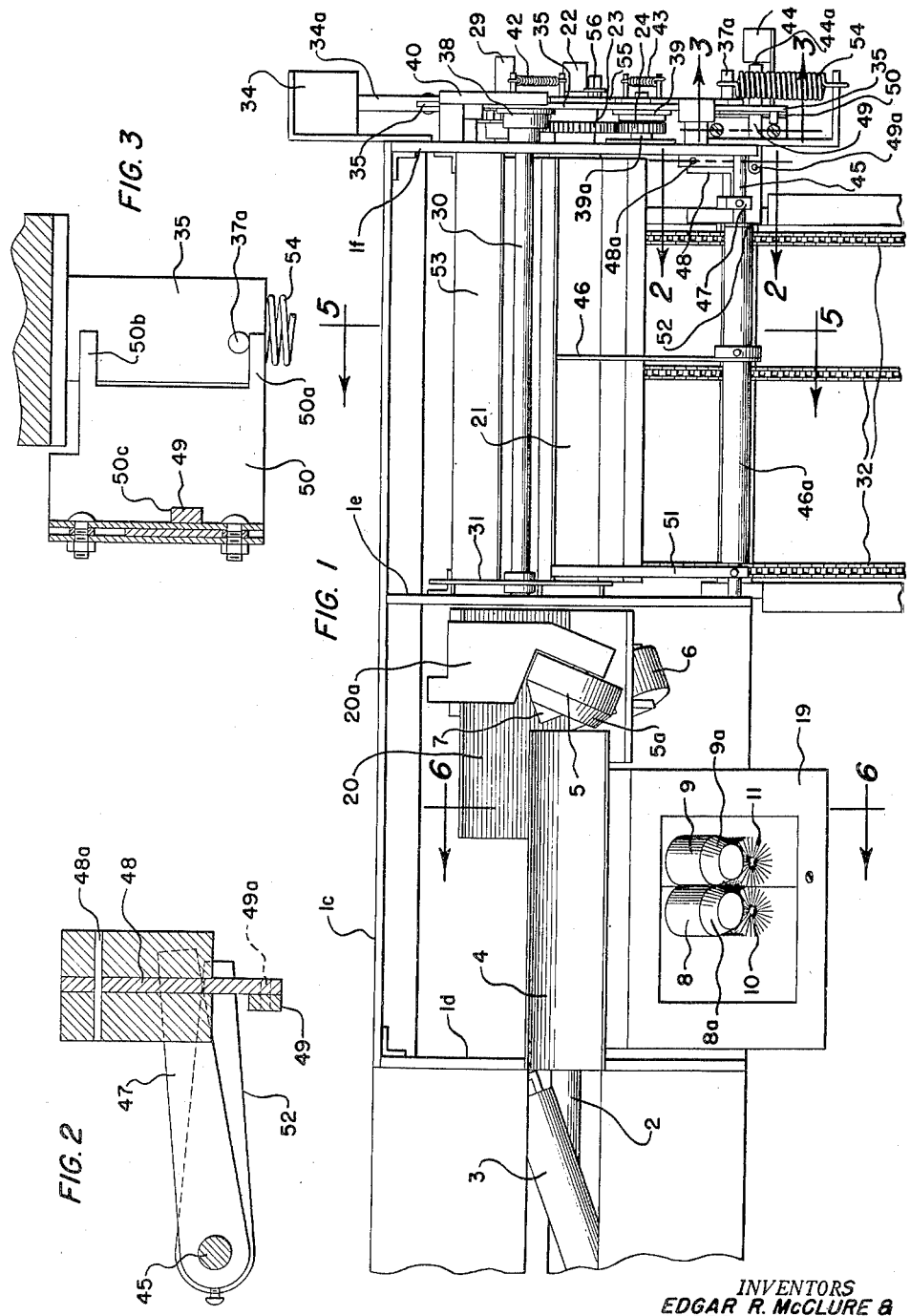

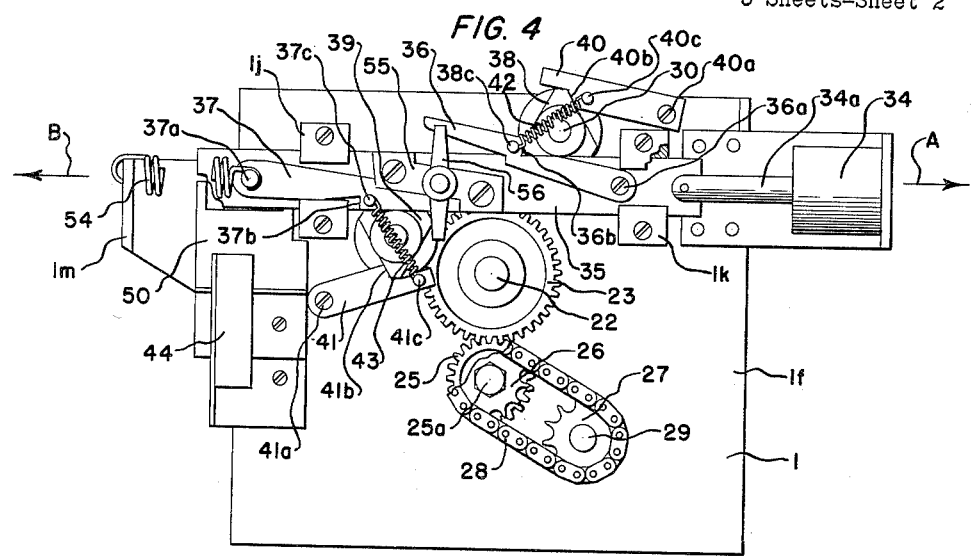

INVENTORS
EDGAR R. McCLURE &
ANDREW L. McCLURE
BY
Wm. H. Dean
AGENT

Patented Feb. 6, 1951

2,540,747

UNITED STATES PATENT OFFICE 2,540,747

SAUSAGE SKINNING AND CUTTING MACHINE

Edgar R. McClure and Andrew L. McClure, San Diego, Calif.

Application April 2, 1949, Serial No. 85,094

9 Claims. (Cl. 17—1)

Our invention relates to a sausage skinning and cutting machine, more particularly to an improvement over our co-pending application, Serial No. 762,424, filed July 21, 1947, now Patent No. 2,514,660, issued July 11, 1950, for Means and Method of Producing Frankfurters, and the objects of our invention are:

First, to provide a machine of this class incorporating very simple and positive intermittent actuating mechanism for rotating the ejector drum and controlling the cut-off of individual sausages from long lengths of sausage;

Second, to provide a machine of this class having novel skin removing mechanism for tearing the plastic skin from a long length of sausage while it is progressively moved longitudinally through the machine and cut off into short lengths;

Third, to provide a very simple solenoid energizing switch means which positively controls the intermittent actuation of the ejector drum and cut-off knife of the machine, in accordance with the longitudinal movement of the sausage through the machine; whereby short lengths of sausage are accurately cut to a certain length;

Fourth, to provide a machine of this class having novel ejector drum means for holding sausage while it is cut off into short lengths and for delivery of said short lengths to a conveyor which carries the short lengths from the machine to a searing heater which sears the cut-off ends of the sausage;

Fifth, to provide a machine of this class which is substantially automatic in operation and which saves considerable labor in the removal of plastic casings from sausage and the cutting of the sausage into short lengths;

Sixth, to provide a machine of this class in which short ends of long lengths of sausage are automatically cut off and automatically dropped from the conveyor intermediate parallel chains thereof, so that all sausages delivered from the machine are of uniform length; and Seventh, to provide a machine of this class which is very simple and economical of construction, efficient in operation, and which will not readily deteriorate or get out of order.

Figure 6:
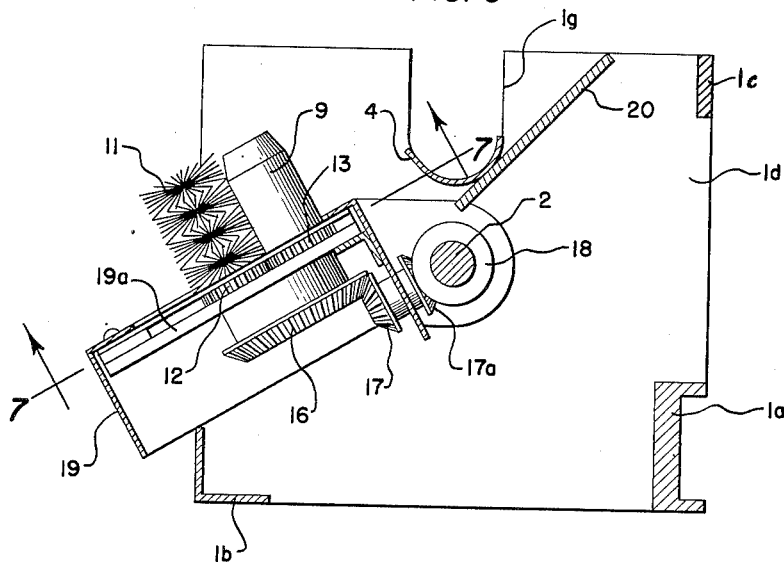
Figure 7:
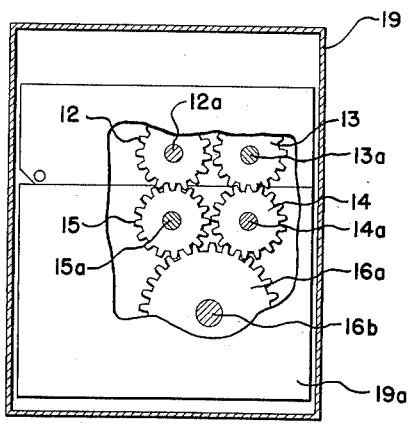

With these and other objects in view, as will appear hereinafter, our invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a fragmentary top or plan view of our sausage skinning and cutting machine; Fig. 2 is an enlarged sectional view taken from the line 2—2 of Fig. 1; Fig. 3 is an enlarged fragmentary sectional view taken from the line 3—3 of Fig. 1; Fig. 4 is an end view of our sausage skinning and cutting machine, showing the actuating mechanism thereof, and showing portions broken away and in section to amplify the illustration; Fig. 5 is a transverse sectional view taken from the line 5—5 of Fig. 1, showing parts and portions fragmentarily; Fig. 6 is a transverse sectional view taken from the line 6—6 of Fig. 1; and Fig. 7 is a sectional view taken from the line 7—7 of Fig. 6, showing portions broken away to amplify the illustration.

Similar characters of reference refer to similar parts and portions throughout the several views of the drawing.

The frame 1, shaft 2, feed rollers 3, trough 4, rollers 5, 6 and 7, skin removal rollers 8 and 9, skin removal brushes 10 and 11, gears 12 to 18, inclusive, skin roller frame 19, roller guide 20, ejector drum 21, drum shaft 22, gears 23, 24 and 25, sprockets 26 and 27, chain 28, conveyor shaft 29, cut-off knife shaft 30, rotary knife 31, conveyor chains 32, searing heaters 33, solenoid 34, actuator bar 35, intermittent operating levers 36 and 37, intermittent gears 38 and 39, intermittent detent levers 40 and 41, springs 42 and 43, microswitch 44, switch actuator shaft 45, switch actuator 46, arm 47, switch actuating levers 48 and 49, slide 50, arms 51 and 52, shield 53, slide spring 54, lever stop 55, and the lever guide 56 constitute the principal parts and portions of our sausage skinning and cutting machine.

The frame 1 is provided with longitudinal structural members 1a, 1b and 1c, as shown in Figs. 5 and 6 of the drawings, which maintain the partition plates 1d, 1e and 1f in rigid fixed relationship to each other. The shaft 2 and feed rollers 3 are similar in construction and operation to the corresponding elements of the machine disclosed in our co-pending application, hereinbefore referred to. The trough 4 is substantially U-shaped in cross-section, as shown in Fig. 6 of the drawings, and is placed in an opening 1g of the partition plate 1d, shown best in Fig. 6 of the drawings. This trough 4 is arranged in alignment with the feed rollers 3 and the axis of the shaft 2 for receiving sausages progressively rotated and moved longitudinally of the axis of the shaft 2. Directly below the trough 4 and fixed on the shaft 2, is the miter gear 18, which meshes with the miter gear portion 17a of the miter gear 17, which is a double-ended miter gear. The opposite end of the miter gear 17 from the end 17a meshes with the miter gear 16, having an integral spur gear portion 16a mounted on a shaft 16b fixed to the plate 19a of the skin roller frame 19, shown best in Figs. 6 and 7 of the drawings.

Meshing with the spur gear portion 16a of the miter gear 16 are spur gears 14 and 15, operating the skin removing brush 10 and the skin removing roller 8, respectively. Meshing with the gears 14 and 15 are the spur gears 12 and 13, which operate the skin removing roller 9 and the skin removing brush 11, respectively. The gears 12, 13, 14 and 15 are fixed to shafts 12a, 13a, 14a and 15a, respectively, and to the shafts 13a and 14a the brushes 11 and 10, respectively, are fixed, while the rollers 8 and 9 are fixed to the shafts 15a and 12a, respectively, all as shown best in Figs. 1 and 7 of the drawings.

The roller guide 20, as shown in Figs. 1 and 6 of the drawings, supports the rollers 5, 6 and 7, which are rotatably mounted in axial triangulation relative to each other, and these rollers are also mounted on axes disposed at an acute angle to the axis of the shaft 2. The roller 5 is rotatably mounted on a pivoted portion 20a of the roller guide 20, permitting movement of the roller 5 relative to the rollers 6 and 7. These rollers 5, 6 and 7 are similar to the rollers 42, 44 and 46 of the hereinbefore mentioned structure disclosed in our co-pending application. The ejector drum 21 is rotatably mounted intermediate the partition plates 1e and 1f of the frame 1 on the shaft 22, which is journaled in said plates 1e and 1f, and this ejector drum 21, as shown in Fig. 5 of the drawings, is provided with a plurality of arcuate troughs 21a, each arranged to index with the sausage entrance opening 1h of the partition plate 1e. Secured intermediate the partition plates 1e and 1f, and substantially spaced from the ejector 21 is the shield 53, which guides sausages ejected from the arcuate troughs 21a onto the conveyor chains 32, which are provided with upwardly extending portions 32b, engageable with the sausages delivered onto said chains 32. These chains 32 pass over sprockets 32a on the conveyor shaft 29, which is journaled at its opposite end in the plates 1e and 1f.

The rotary knife 31 is a 3-bladed knife, as shown in Fig. 5 of the drawings, and is fixed to the cut-off knife shaft 30, which is journaled at its opposite end in the plates 1e and 1f. The conveyor shaft 29 extends through the plate 1f of the frame 1, as shown in Fig. 4 of the drawings, and fixed thereon is a sprocket 27 engaged by the chain 28 passing over the sprockets 26, which is fixed to the gear 25 rotating on the bolts 25a, fixed to the frame plate 1f. The gear 25 meshes with the gear 23, fixed to the shaft 22, on which the ejector drum is mounted. Meshing with the gear 23 is the gear 24, and fixed to the gear 24 is the intermittent gear 39, rotating on the stub shaft 39a, fixed to the frame plate 1f. Mounted on the outwardly extending end of the cut-off knife shaft 30 is the intermittent gear 38, all as shown best in Fig. 4 of the drawings. It will be noted that the intermittent gears 38 and 39 are triangular gears, each having three substantially straight engaging sides, one of which remains parallel to the upper and lower edges of the actuator bar 35 when at rest.

This actuator bar 35 is reciprocally mounted in guides 1k and 1j, fixed to the frame plate 1f. Pivoted on this actuator bar 35 by means of pins 36a and 37a are the intermittent operating levers 36 and 37. These levers 36 and 37 are provided with intermittent gear engaging ledges 36b and 37b, respectively, which are engageable with the intermittent gears 38 and 39, respectively. The lever stop 55 is fixed to the actuator slide 35 and provides a pivotal stop for the intermittent operating levers 36 and 37, while the guide 56 maintains lateral disposition of the intermittent operating levers 36 and 37 during pivotal movement thereof about the axis of the pins 36a and 37a, respectively. The pin 37a is extended outwardly of the lever 37 and secured thereon is one end of the spring 54, the opposite end of which is secured to a stationary portion 1m of the frame 1, which is secured to the plate 1f.

Pivotally connected by means of the pin 34a to the opposite end of the actuator bar 35 from the spring 54 is the solenoid 34, which is an electrically operated magnetic device for reciprocating the actuator bar 35 in opposed relation to the tension of the spring 54. The intermittent detent levers 40 and 41 are pivotally mounted to the frame plate 1f by means of the pins 40a and 41a, and these levers 40 and 41 are provided with intermittent gear engaging stops 40b and 41b, respectively. The spring 43 is a tension spring and is connected to projecting pins 41c and 37c of the intermittent detent lever 41 and the intermittent operating lever 37. The spring 42 interconnects projecting pins 38c and 40c, connected to the intermittent operating lever 36 and the intermittent detent lever 40, respectively.

The microswitch 44, connected to the frame plate 1f, is provided with a reciprocating button 44a, engageable with the end of the switch operating lever 49, which is pivoted by means of the pin 49a to the switch operating lever 48, which is pivoted by means of the pin 48a to the frame plate 1f, all as shown best in Fig. 1 of the drawings. The switch actuating lever 48 is substantially U-shaped and is engaged intermediate its legs by the arm 47 fixed to the switch operating shaft 45, which is pivoted at its opposite ends in the frame plates 1e and 1f of the frame 1. Fixed on the switch actuator shaft 45, near the opposite end thereof from the arm 47 is the arm 51, which projects over the center of the ejector drum for engagement with the short ends of the sausages passing through the opening 1h. Slidably mounted on the switch actuator shaft 45 is a sleeve 46a, carrying the switch actuator 46, which is engageable with the ends of sausages passing through the opening 1h of the frame plate 1e, and into one of the arcuate troughs 21a of the ejector drum 21.

The arm 52, shown in Figs. 1 and 2 of the drawings, is engageable with one end of the switch actuator lever 48 for moving the end of the lever 49 into engagement with the switch button 44a, when the switch actuator 46 is contacted by a sausage. The switch actuating lever 49 is supported in the slide 50, as shown in Fig. 3 of the drawings, which is provided with stop portions 50a and 50b, engageable with the pin 37a as the actuator bar 35 is alternately reciprocated. Thus, the lever 49 is pivoted out of alignment with the switch button 44a when the actuator bar 35 is moved toward the solenoid 34.

It will be noted that the slide 50 is provided with an opening 50c, through which the switch actuating lever 49 passes, and in which the switch actuating lever 49 is reciprocally mounted.

The operation of our sausage skinning and cutting machine is substantially as follows:

The shaft 2 is rotated by a motor, not shown, but which is disclosed in our co-pending application hereinbefore referred to. The rollers 3, in their angular relationship to the axis of the shaft 2, resting on the shaft 2, rotate and cause concurrent rotary motion of a long length of sausage thereon, and longitudinal movement of the sausage relative to the axis of the shaft 2. As the sausage moves toward the rollers 8 and 9, it passes through the opening 1g, shown in Fig. 6 of the drawings, onto the trough 4, whereupon a strip of the sausage casing previously prepared by the operator of the machine, is placed intermediate the rollers 8 and 9, which are substantially peripherally contacted by each other. The conical head portions 8a and 9a provide diverging portions intermediate which the skin of the sausage may be initially wedged. The rollers 8 and 9 feed the skin of the sausage therebetween toward the brushes 10 and 11, which brush the skin and the rollers 8 and 9 for removing the skin by friction of the bristles, which causes tension on the skin and tears the same in helical form from the exterior of the long length of sausage passing through the trough 4. It will be noted that the rotational speed of the brushes 10 and 11 and the rollers 8 and 9 substantially leads the rotational speed of the sausage caused by the rollers 3 riding on the shaft 2, which promotes sufficient tension on the strip of skin being torn from the body of the sausage to continually and evenly tear the same therefrom.

The sausage progresses from the trough 4 intermediate the rollers 5, 6 and 7, whereupon the roller 5 is raised by engagement of the sausage on the conical face 5a of the roller 5. This raising of the roller 5 causes pivotal movement of the bracket 20a thereof, which supports the same in connection with the roller guide 20. These rollers 5, 6 and 7 maintain constant alignment of the sausage, which feeds through the opening 1h in the partition 1e, and into one of the arcuate recess portions 21a of the ejector drum 21. The rounded end of the sausage as it passes raises the arm 51 and the sausage abuts the switch actuator 46, forcing the same toward the end plate 1f of the frame 1.

This pressure by the sausage on the switch actuator 46 reciprocates the sleeve 46a on the shaft 45, causing the arm 52 to engage the lever 48 and pivot the same around the axis of the pin 48a, which transfers reciprocal motion to the lever 49, which, when in rest position, aligns with the button 44a of the microswitch 44. When the lever 49 is longitudinally actuated, and the button 44a of the microswitch 44 is depressed, the solenoid 34, electrically connected with said microswitch 44, retracts its plunger 34a and causes the actuator slide 35 to move in the direction as indicated by the arrow A in Fig. 4 of the drawings. As the actuator bar 35 moves in the direction as indicated by the arrow A, the ledge 36b of the intermittent operating lever 36 engages one corner of the intermittent gear 38 and rotates the same substantially 120°, it being noted that the spring 42 maintains the ledge 36b of the intermittent operating lever 36 in engagement with the one corner of the intermittent gear 38, and concurrently maintains the intermittent detent lever 40 at its stop portion 40b in engagement with the intermittent gear 38, so that the intermittent gear 38, during each movement of the actuator bar 35 in the direction as indicated by the arrow A, is rotated precisely 120°.

As the actuator bar 35 moves in the direction as indicated by the arrow A, the pin 37a in connection therewith passes intermediate the stop portions 50a and 50b of the slide 50 and engages the stop portion 50b, as shown in Fig. 3 of the drawings, which causes the lever 49, engaged by the slide 50, to be disengaged from the switch button 44a of the microswitch 44, which breaks the circuit to the solenoid 34, de-energizing the same and permitting the spring 54 to return the actuator bar 35 in the direction as indicated by the arrow B in Fig. 4 of the drawings. As the actuator slide 35 moves in the direction as indicated by the arrow B in Fig. 4 of the drawings, the ledge 37b of the intermittent actuating lever 37 engages one corner of the intermittent gear 39 and moves the same substantially 120°, which is positively indexed by the intermittent gear detent 41 at its ledge 41b, held in engagement with the intermittent gear 39 by the spring 43.

It will be noted that the initial movement of the actuator bar 35 in the direction as indicated by the arrow A, with the energization of the solenoid 34, that rotation of the intermittent gear 38 in connection with the shaft 30 causes rotary motion of the rotary knife 31 while the ejector drum 21 is in stationary position. Thus, the rotary knife 31 cuts off the sausage in certain spaced relation from the switch actuator 46, as shown in Fig. 1 of the drawings, and subsequent operation of the intermittent gear 39, as hereinbefore described, causes clockwise rotation of the ejector drum 21, which advances the cut-off sausage downwardly within the shield 53, and eventually the sausage is placed on the conveyor chains 32 which carry the same to the searing heater 33, all of which is conventional to our co-pending application hereinbefore set forth.

It will be here noted that when the butt end of the long length of sausage passes into the ejector drum 21 in one of the arcuate recesses 21a thereof, the arm 51 passes downwardly by gravitation, pivoting the arm 47 toward the lever 48, which pivots the same around the axis of the pin 48a and causes engagement of the lever 49 with the button 44a of the microswitch 44, which causes actuation of the actuator bar 35 and rotation of the cut-off knife shaft 30, and concurrent rotation of the ejector drum 21, which drops the sausage below the shield 53, and this short end being substantially less than the distance between the rotary knife 31 and the switch actuator 46, falls between the chains 32.

It will be here noted that the gear 24, in fixed relationship with the intermittent gear 39, causes rotation of the gear 23, and the gear 25, whereby the ejector drum 21 and conveyor shaft 29 operate concurrently.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a sausage skinning and cutting machine, a main shaft, rollers engaging the upper side of said main shaft and disposed at an acute angle thereto, a trough in alignment with said main shaft, a pair of skin rollers laterally of said trough, gear means in connection with said main shaft for rotating said rollers, an ejector drum having a longitudinal recess therein, a cut-off knife at one end of said ejector drum, a switch actuator in interfering relationship with sausage passing in said longitudinal recess of said ejector drum, an electrical switch operatively connected with said switch actuator, a solenoid electrically connected with said switch, an actuator bar connected with said solenoid, intermittent gears adjacent said actuator bar, having a plurality of flat sides, intermittent actuator levers pivoted on said bar having portions engageable with said gears for rotating the same during reciprocal movement of said bar, one of said intermittent operating levers engageable with one of said intermittent gears when said bar moves in one direction, the other intermittent gear engageable with said other intermittent gear operating lever when said bar moves in the other direction, one of said gears connected with said ejector drum, the other of said gears in connection with said rotary knife.

2. In a sausage skinning and cutting machine, a main shaft, rollers engaging the upper side of said main shaft and disposed at an acute angle thereto, a trough in alignment with said main shaft, a pair of skin rollers laterally of said trough, gear means in connection with said main shaft for rotating said rollers, an ejector drum having a longitudinal recess therein, a cut-off knife at one end of said ejector drum, a switch actuator in interfering relationship with sausage passing in said longitudinal recess of said ejector drum, an electrical switch operatively connected with said switch actuator, a solenoid electrically connected with said switch, an actuator bar connected with said solenoid, intermittent gears adjacent said actuator bar, having a plurality of flat sides, intermittent actuator levers pivoted on said bar having portions engageable with said gears for rotating the same during reciprocal movement of said bar, one of said intermittent operating levers engageable with one of said intermittent gears when said bar moves in one direction, the other intermittent gear engageable with the other intermittent gear operating lever when said bar moves in the other direction, one of said gears connected with said ejector drum, the other of said gears in connection with said rotary knife, spur gear means operatively connected with one of said intermittent gears, a conveyor shaft operated by said spur gear means.

3. In a sausage skinning and cutting machine, a main shaft, rollers engaging the upper side of said main shaft and disposed at an acute angle thereto, a trough in alignment with said main shaft, a pair of skin rollers laterally of said trough, gear means in connection with said main shaft for rotating said rollers, an ejector drum having a longitudinal recess therein, a cut-off knife at one end of said ejector drum, a switch actuator in interfering relationship with sausage passing in said longitudinal recess of said ejector drum, an electrical switch operatively connected with said switch actuator, a solenoid electrically connected with said switch, an actuator bar connected with said solenoid, intermittent gears adjacent said actuator bar, having a plurality of flat sides, intermittent actuator levers pivoted on said bar having portions engageable with said gears for rotating the same during reciprocal movement of said bar, one of said intermittent operating levers engageable with one of said intermittent gears when said bar moves in one direction, the other intermittent gear engageable with said other intermittent gear operating lever when said bar moves in the other direction, one of said gears connected with said ejector drum, the other of said gears in connection with said rotary knife, spur gear means operatively connected with one of said intermittent gears, a conveyor shaft operated by said spur gear means, sprockets on said conveyor shaft having chains engaging the same, positioned below said ejector drum for receiving sections of sausage therefrom.

4. In a sausage skinning and cutting machine, a main shaft, rollers engaging the upper side of said main shaft and disposed at an acute angle thereto, a trough in alignment with said main shaft, a pair of skin rollers laterally of said trough, gear means in connection with said main shaft for rotating said rollers, an ejector drum having a longitudinal recess therein, a cut-off knife at one end of said ejector drum, a switch actuator in interfering relationship with sausage passing in said longitudinal recess of said ejector drum, an electrical switch operatively connected with said switch actuator, a solenoid electrically connected with said switch, an actuator bar connected with said solenoid, intermittent gears adjacent said actuator bar, having a plurality of flat sides, intermittent actuator levers pivoted on said bar having portions engageable with said gears for rotating the same during reciprocal movement of said bar, one of said intermittent operating levers engageable with one of said intermittent gears when said bar moves in one direction, the other intermittent gear engageable with said other intermittent gear operating lever when said bar moves in the other direction, one of said gears connected with said ejector drum, the other of said gears in connection with said rotary knife, spur gear means operatively connected with one of said intermittent gears, a conveyor shaft operated by said spur gear means, sprockets on said conveyor shaft having chains engaging the same, positioned below said ejector drum for receiving sections of sausage therefrom, a shield partially surrounding said drum above said conveyor chains.

5. In a sausage skinning and cutting machine, means for rotating a long length of sausage and concurrently feeding the same longitudinally of its axis, a pair of rollers for stripping the skin helically from said sausage, an ejector drum having a longitudinal recess therein, aligned with said sausage for receiving the same, a rotary knife at one end of said ejector drum, a switch actuator in spaced relation with said knife, a switch operated by said switch actuator, a solenoid electrically connected with said switch, an actuator bar connected with said solenoid, a spring tending to force said actuator bar away from said solenoid, a pair of intermittent gears adjacent said bar, levers on said bar pivotally connected therewith and engageable with said gears, whereby one of said gears is rotated a partial revolution when said bar moves in one direction, and the other of said gears is rotated a partial revolution when said bar moves in the opposite direction, a pivoted lever in connection with said switch actuator, means in connection with said bar for pivoting said lever, the end of said lever in connection with said switch actuator being movable into and out of contact position with said switch by reciprocal movement of said actuator bar.

6. In a sausage skinning and cutting machine, means for rotating a long length of sausage and concurrently feeding the same longitudinally of its axis, a pair of rollers for stripping the skin helically from said sausage, an ejector drum having a longitudinal recess therein, aligned with said sausage for receiving the same, a rotary knife at one end of said ejector drum, a switch actuator in spaced relation with said knife, a switch operated by said switch actuator, a solenoid electrically connected with said switch, an actuator bar connected with said solenoid, a spring tending to force said actuator bar away from said solenoid, a pair of intermittent gears adjacent said bar, levers on said bar pivotally connected therewith and engageable with said gears, whereby one of said gears is rotated a partial revolution when said bar moves in one direction, and the other of said gears is rotated a partial revolution when said bar moves in the opposite direction, a pivoted lever in connection with said switch actuator, means in connection with said bar for pivoting said lever, the end of said lever in connection with said switch actuator being movable into and out of contact position with said switch by reciprocal movement of said actuator bar, a stationary frame in which said actuator bar is reciprocally mounted, intermittent detent levers pivoted on said frame in opposed relation to said intermittent operating levers on said actuator bar, and a spring interconnecting each intermittent operating lever with the respective intermittent detent lever for maintaining both of said levers in engagement with the respective intermittent gear.

7. In a machine of the class described, a frame, an ejector drum rotatably mounted in said frame, having a sausage receiving recess therein, a switch actuator engageable with the sausage passing longitudinally of said recess in said ejector drum, a switch operatively connected with said switch actuator, an electrically actuated device electrically connected with said switch, a bar reciprocally mounted in connection with said frame, and connected to said electrically operated device and movable thereby in reciproca relationship with said frame, a pair of intermittent gears, a cutter, in connection with one of said intermittent gears, positioned at one end of said ejector drum in spaced relationship with said switch actuator, a second intermittent gear for rotatably operating said ejector drum, each of said intermittent gears having a plurality of engaging surfaces thereon, pivoted members on said actuator bar having portions engageable with said intermittent gears, whereby one of said gears is engaged and actuated when said bar moves in one direction, and the other of said gears is engaged and actuated when said bar moves in the opposite direction, intermittent detent levers stationarily mounted on said frame, resilient means in connection with said detent levers for maintaining the same in engagement with said intermittent gears.

8. In a machine of the class described, a frame, an ejector drum rotatably mounted in said frame, having a sausage receiving recess therein, a switch actuator engageable with the sausage passing longitudinally of said recess in said ejector drum, a switch operatively connected with said switch actuator, an electrically actuated device electrically connected with said switch bar, a bar reciprocally mounted in connection with said frame, and connected to said electrically operated device and movable thereby in reciprocal relationship with said frame, a pair of intermittent gears, a cutter in connection with one of said intermittent gears, positioned at one end of said ejector drum in spaced relationship with said switch actuator, a second intermittent gear for rotatably operating said ejector drum, each of said intermittent gears having a plurality of engaging surfaces thereon, pivoted members on said actuator bar having portions engageable with said intermittent gears, whereby one of said gears is engaged and actuated when said bar moves in one direction, and the other of said gears is engaged and actuated when said bar moves in the opposite direction, intermittent detent levers stationarily mounted on said frame, resilient means in connection with said detent levers for maintaining the same in engagement with said intermittent gears, resilient means in connection with said first-mentioned levers for maintaining the same in engagement with said intermittent gears.

9. In a machine of the class described, a frame, an ejector drum rotatably mounted in said frame, having a sausage receiving recess therein, a switch actuator engageable with the sausage passing longitudinally of said recess in said ejector drum, a switch operatively connected with said switch actuator, an electrically actuated device electrically connected with said switch, a bar reciprocally mounted in connection with said frame, and connected to said electrically operated device and movable thereby in reciprocal relationship with said frame, a pair of intermittent gears, a cutter in connection with one of said intermittent gears, positioned at one end of said ejector drum in spaced relationship with said switch actuator, a second intermittent gear for rotatably operating said ejector drum, each of said intermittent gears having a plurality of engaging surfaces thereon, pivoted members on said actuator bar having portions engageable with said intermittent gears, whereby one of said gears is engaged and actuated when said bar moves in one direction, and the other of said gears is engaged and actuated when said bar moves in the opposite direction, intermittent detent levers stationarily mounted on said frame, resilient means in connection with said detent levers for maintaining the same in engagement with said intermittent gears, resilient means in connection with said first-mentioned levers for maintaining the same in engagement with said intermittent gears, means in connection with said actuator bar for disengaging said switch actuator from said switch when said actuator bar moves in one direction, causing concurrent rotation of said ejector drum.

EDGAR R. McCLURE.
ANDREW L. McCLURE.

No references cited.